United States Patent
Currivan et al.

(10) Patent No.: US 7,697,546 B2
(45) Date of Patent: Apr. 13, 2010

(54) SYNCHRONIZATION OF DISTRIBUTED CABLE MODEM NETWORK COMPONENTS

(75) Inventors: Bruce J. Currivan, Dove Canyon, CA (US); Alexander G. MacInnis, Lake Oswego, OR (US); Thomas J. Kolze, Phoenix, AZ (US); Richard S. Prodan, Boulder, CO (US)

(73) Assignee: Broadcom Corporation, Irvine, CA (US)

( * ) Notice: Subject to any disclaimer, the term of this patent is extended or adjusted under 35 U.S.C. 154(b) by 806 days.

(21) Appl. No.: 11/061,147

(22) Filed: Feb. 18, 2005

(65) Prior Publication Data

US 2006/0056461 A1     Mar. 16, 2006

Related U.S. Application Data (60) Provisional application No. 60/609,663, filed on Sep. 14, 2004, provisional application No. 60/629,781, filed on Nov. 20, 2004, provisional application No. 60/635,531, filed on Dec. 11, 2004.

(51) Int. Cl.
    *H04L 12/28* (2006.01)
(52) U.S. Cl. .......... 370/395.62; 370/350; 370/352; 370/355; 370/490; 370/503; 375/219; 375/222; 709/223; 713/400; 725/111
(58) Field of Classification Search .......... 370/395.62, 370/350, 352, 355, 490, 503; 375/219, 222; 709/223; 713/400; 725/111
    See application file for complete search history.

(56) References Cited

U.S. PATENT DOCUMENTS

| | | | |
|---|---|---|---|
| 6,763,032 B1 * | 7/2004 | Rabenko et al. | 370/442 |
| 6,791,995 B1 * | 9/2004 | Azenkot et al. | 370/436 |
| 6,834,057 B1 * | 12/2004 | Rabenko et al. | 370/468 |
| 7,068,712 B1 * | 6/2006 | Zang et al. | 375/222 |
| 7,088,678 B1 * | 8/2006 | Freed et al. | 370/230 |
| 7,203,227 B1 * | 4/2007 | Currivan et al. | 375/222 |
| 7,248,590 B1 * | 7/2007 | Liu | 370/395.64 |
| 2001/0033583 A1 * | 10/2001 | Rabenko et al. | 370/503 |
| 2001/0033611 A1 | 10/2001 | Grimwood et al. | |
| 2002/0061012 A1 * | 5/2002 | Thi et al. | 370/352 |
| 2002/0129378 A1 | 9/2002 | Cloonan et al. | |

(Continued)

FOREIGN PATENT DOCUMENTS

WO      WO 01/19005 A1     3/2001

*Primary Examiner*—Ricky Ngo
*Assistant Examiner*—Luat Phung
(74) *Attorney, Agent, or Firm*—Garlick Harrison & Markison; Bruce E. Garlick; Shayne X. Short (57) ABSTRACT

A distributed cable modem termination system of the present invention includes a downstream transmitter hub, an upstream receiver hub, and a head end that communicatively couples to the downstream transmitter hub and to the upstream receiver hub via a packet data network. The head end and the downstream transmitter hub are operable to synchronize a clock of the downstream transmitter hub with a clock of the head end. Further, the upstream receiver hub and the downstream transmitter hub are operable to synchronize a clock of the upstream receiver hub with the clock of the downstream transmitter hub. Clock synchronization between the upstream receiver hub and the downstream transmitter hub are performed using ranging operations supported by at least one cable modem communicatively coupled to both the upstream receiver hub and the downstream transmitter hub via cable modem network plant.

30 Claims, 7 Drawing Sheets

U.S. PATENT DOCUMENTS

| | | |
|---|---|---|
| 2002/0186803 A1* | 12/2002 | Kolze ...................... 375/358 |
| 2004/0095963 A1 | 5/2004 | Rakib |
| 2004/0163120 A1 | 8/2004 | Rabenko et al. |
| 2004/0252678 A1* | 12/2004 | Rabenko et al. ............ 370/352 |
| 2006/0056461 A1* | 3/2006 | Currivan et al. ............ 370/503 |
| 2006/0123452 A1* | 6/2006 | Azenkot et al. ............ 725/111 |
| 2007/0195824 A9* | 8/2007 | Chapman et al. ........... 370/490 |

\* cited by examiner

SYNCHRONIZATION OF DISTRIBUTED CABLE MODEM NETWORK COMPONENTS

CROSS REFERENCES TO RELATED APPLICATIONS

This application is related to U.S. Utility application Ser. No. 11/031,568, filed Jan. 6, 2005. The present application claims priority to U.S. Provisional Patent Application Ser. No. 60/609,663, filed Sep. 14, 2004, to U.S. Provisional Patent Application Ser. No. 60/629,781, filed Nov. 20, 2004, and to U.S. Provisional Patent Application Ser. No. 60/635,531, filed Dec. 11, 2004, all of which are incorporated herein by reference for all purposes.

BACKGROUND OF THE INVENTION

1. Field of the Invention

The invention relates generally to communication systems and, more particularly, it relates to cable modem communication systems.

2. Description of Related Art

Conventional cable modem communication systems include Cable Modem Termination Systems (CMTSs), serviced Cable Modems (CMs), and a cable modem network plant, i.e., hybrid fiber-coaxial media that communicatively couples these devices. The CMTS services data communications for the CMs via downstream transmissions from the CMTS to the CMs and upstream transmissions from the CMs to the CMTS. The Data Over Cable Service Interface Specification (DOCSIS) typically governs the transmission and receipt of signals of the cable modem communication system. In its various forms, DOCSIS supports Time Division Multiple Access (TDMA), Frequency Division Multiple Access (FDMA), and Code Division Multiple Access (CDMA) operations. Ranging and registering operations are performed to manage the timing of communications between the CMTS and the CMs.

The structure of CM communications systems continues to evolve. One evolution of the structure of cable modem communication systems includes distributing the CMTS across differing devices that intercouple via a packet data network. Operation of the CM communication system requires synchronization of the distributed CMTS components. Because the packet data network introduces significant jitter, it would likely be impractical to use the packet data network to meet the accuracy required for synchronization of CMTS components without adding excessive latency. Thus, a need exists for synchronizing the distributed CMTS components while meeting all system requirements.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
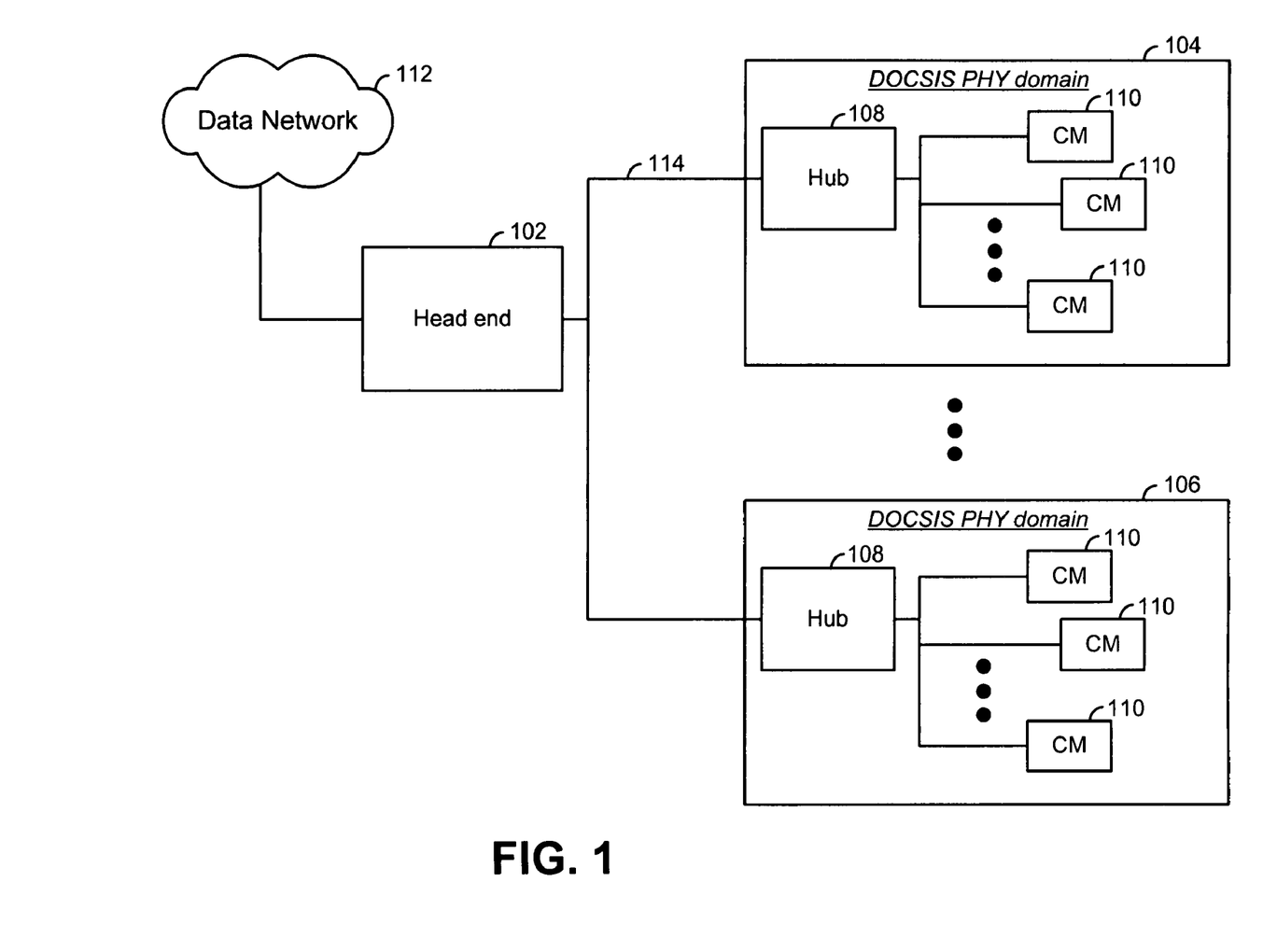
FIG. 1 is a system diagram illustrating a cable modem communication system having distributed Cable Modem Termination System (CMTS) head end components.

FIG. 1 is a system diagram illustrating a cable modem communication system having distributed Cable Modem Termination System (CMTS) head end components. As is illustrated in FIG. 1, the distributed CMTS includes a head end 102 and distributed hubs 108. Each of the distributed hubs 108 services a respective Data Over Cable System Interface Specification (DOCSIS) Physical Layer (PHY) domain 104 and 106. Each DOCSIS PHY domain 104 and 106 services a plurality of cable modems (CMs) 110. The head end 102 couples to the hubs 108 via a media 114. The head end 102 transfers data to, and receives data from the cable modems 100 via the hubs 108 and the media 114.

Synchronization of transmissions within the PHY domains 104 and 106 is a requirement. When supporting TDMA operations, burst transmissions (both upstream and downstream) within each DOCSIS PHY domain 104 and 106 must be sent at accurate times (100 ns level) to avoid collision. When operating in the DOCSIS 2.0 S-CDMA mode, timing is even more critical because synchronization to the symbol level is required. Thus, a more stringent synchronization on the order of 1 ns is required. In order to meet these timing requirements, the head end 102 could maintain a reference clock, e.g., operating at 10.24 MHz. The hubs 108 could then lock their clocks to the reference clock of the head end 102 via link 114. Each CM 110 could then lock its clock to the downstream symbol clock, which is synchronized to the 10.24 MHz reference clock. Ranging operations could then be employed to adjust the offsets of the clocks of the CMs 110 to within 1 ns, typically. Once ranged, a CM 110 should not drift off in time, due to the closed-loop synchronous aspects of the system. However, to allow for changes in the cable modem network plant propagation delay as temperature, wind and other factors vary, ranging is repeated every 30 seconds, or more often, for each CM 110. With this synchronization enacted, the entire DOCSIS PHY 104 and/or 106 are synchronous.

When link 114 does not support synchronization to the reference clock of the head end 102, these operations cannot be performed. The operations of the present invention overcome this problem. Generally, packet data flow downstream from the headend to each hub is managed to in an attempt to avoid transmit buffer overflow or underflow. Further, the clocks of various components of the hubs 108 are synchronized using ranging operations so that collisions within DOCSIS PHY domains 104 and 106 themselves are avoided. Alternately, when supporting S-CDMA, symbol timing drift over time may be employed to synchronize clocks of the hubs 108.

Figure 2:
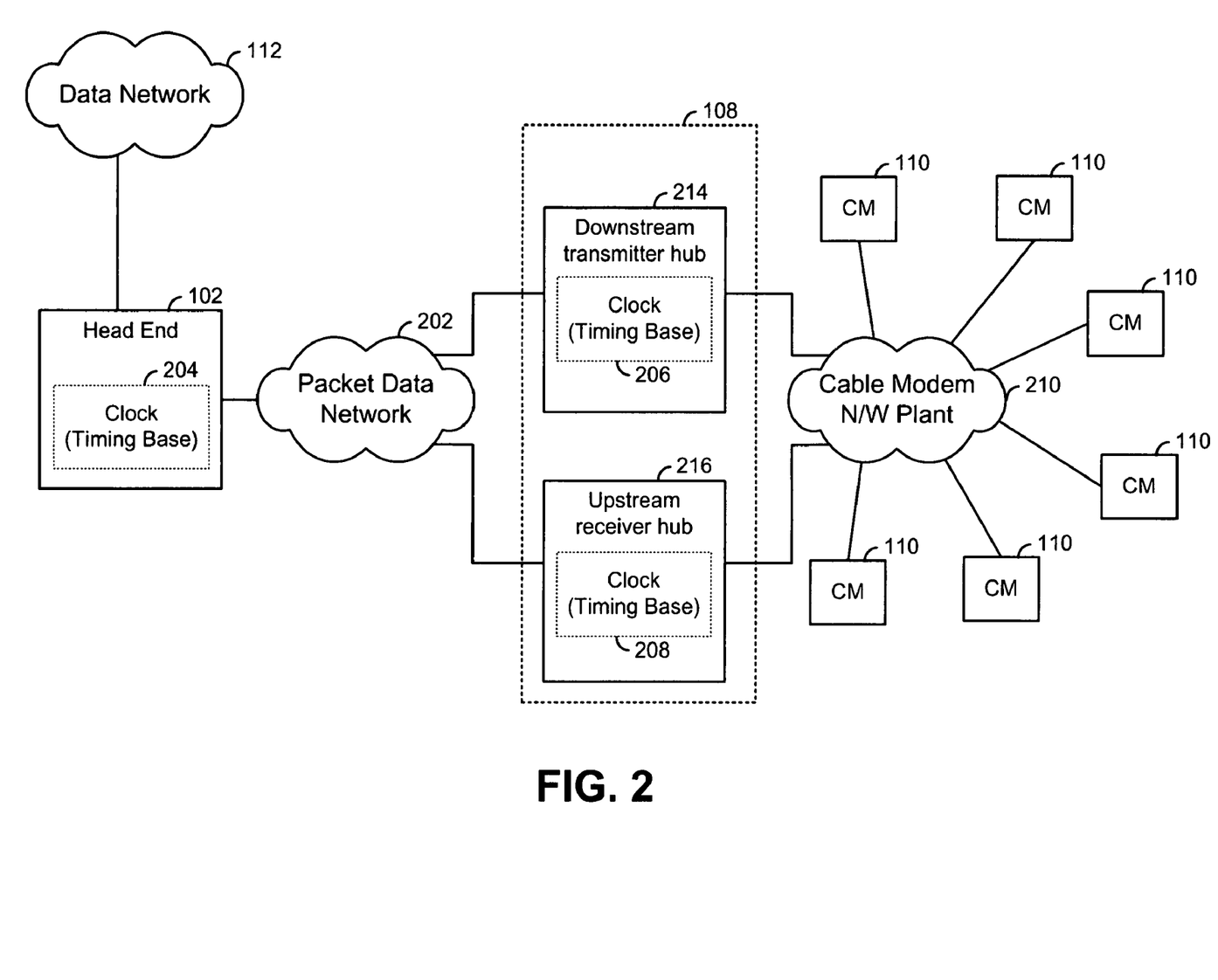
FIG. 2 is a system diagram illustrating a cable modem communication system constructed according to the present invention having distributed CMTS components intercoupled by a packet switched network.

FIG. 2 is a system diagram illustrating a cable modem communication system constructed according to the present invention having distributed CMTS components intercoupled by a packet data network 202. A distributed CMTS includes a head end 102 and a hub 108 that includes a downstream transmitter hub 214 and an upstream receiver hub 216. The head end 102, the downstream transmitter hub 214, and the upstream receiver hub 216 couple to one another via the packet data network 202. The packet data network 202 may be an Ethernet network or another type of packet data network. The downstream transmitter hub 214 and the upstream receiver hub 216 of the hub 108 may reside in differing facilities. However, in other embodiment the downstream transmitter hub 214 and the upstream receiver hub 216 may be located in a single facility.

The downstream transmitter hub 214 and the upstream receiver hub 216 couple to cable modem network plant 210. CMs 110 also couple to cable modem network plant 210. The cable modem network plant 210 may be a hybrid fiber coaxial cable modem network 210 or another type of cable modem network plant that's generally known. The distributed CMTS services data communications between data network 112 and CMs 110 via the cable modem network plant 210.

The distributed CMTS operates according to the DOCSIS specification, in some embodiments. As was discussed above, the DOCSIS MAC uses TDMA, FDMA, and/or S-CDMA to service data communications with the CMs 110 across the cable modem network plant 210. Thus, according to these specifications, it is desirable for the head end 102 to be substantially in synchronization with the downstream transmitter hub 214 and the upstream receiver hub 216 from a packet data flow perspective. The downstream transmitter hub 214 includes a clock (timing base) 206. The upstream receiver hub 216 includes clock (timing base) 208. The clocks (timing bases) 206, and 208 of the downstream transmitter hub 214 and the upstream receiver hub 216, respectively, should be sufficiently synchronized to satisfy the timing requirements of the DOCSIS specification. Thus, according to the present invention, the clocks 206 and 208 of the distributed CMTS components are sufficiently synchronized so that the timing requirements of the DOCSIS standards are met. The terms "clocks" and "timing bases" are used interchangeably herein when referring to mechanisms within the downstream transmitter hub 214 and the upstream receiver hub 216 for keeping a system time or other time reference.

The packet data network 202 has a limited ability to distribute accurate timing information due to its inherent jitter. The head end 102 may include a clock (timing base) 204. One possibility for maintaining system time in the distributed CMTS structure of FIG. 2 is to transfer timing information from the head end 102 to the downstream transmitter hub 214 and the upstream receiver hub 216 over the packet data network 202 using time stamps. The downstream transmitter hub 214 and the upstream receiver hub 216 would smooth the jitter caused by the packet data network 202 and recover the timing base clock from the timestamps, typically employing a filter to smooth the time stamps. In order to consider whether the structure of FIG. 2 can support such operations, an analysis may assume the following typical parameters:

1. The packet data network 202 supports Gigabit Ethernet operations.
2. Jitter on a Gigabit Ethernet link=1 ms.
3. After smoothing, timestamp jitter=100 ns, in order to meet overall budget of 500 ns.
4. Timestamp messages are sent at a rate of 100 per second.

The smoothing that would be necessary is the ratio 1 ms/100 ns=$1\times10^4$. Assuming independent jitter on each timestamp, N=$1\times10^8$ timestamps may have to be averaged to achieve smoothing of $1\times10^4$. This would require a smoothing time constant of $1\times10^8$ sec/100=$1\times10^6$ sec, or 11.6 days, which is impractical. In order to use the packet data network 202 to distribute timing information, the packet data network would have to have a jitter limit of approximately 17 us, which is not currently feasible.

Thus, according to the present invention, other techniques are employed to synchronize the components of the distributed CMTS. According to a first aspect of the present invention, packet data flow from the head end 102 to the downstream transmitter hub 214 is substantially synchronized in an attempt to avoid overflow and underflow of a transmit buffer of the downstream transmitter hub 214. These operations will be described with reference to FIG. 6. Alternately, packet data flow from the head end 102 to the downstream transmitter hub 214 may be substantially synchronized using a control loop within the downstream transmitter hub 214 stimulated by time stamps transmitted from the head end 102. These operations will be described further with reference to FIG. 5.

In order to complete synchronization of the distributed CMTS components, the clocks 206 and 208 of the downstream transmitter hub 214 and the upstream receiver hub 216, respectively, are substantially synchronized. Using a first technique according to the present invention, such synchronization is performed using ranging operations supported by at least one cable modem communicatively coupled to both the upstream receiver hub and the downstream transmitter hub via cable modem network plant. These operations are described further with reference to FIGS. 3 thru 4. Another technique for synchronizing the clock 208 of the upstream receiver hub 216 to the clock 206 of the downstream transmitter hub includes detecting clock drift based upon changes in alignment of symbols received by the upstream receiver hub 216 when supporting S-CDMA operations. This technique will be described further with reference to FIG. 7.

Figure 3:
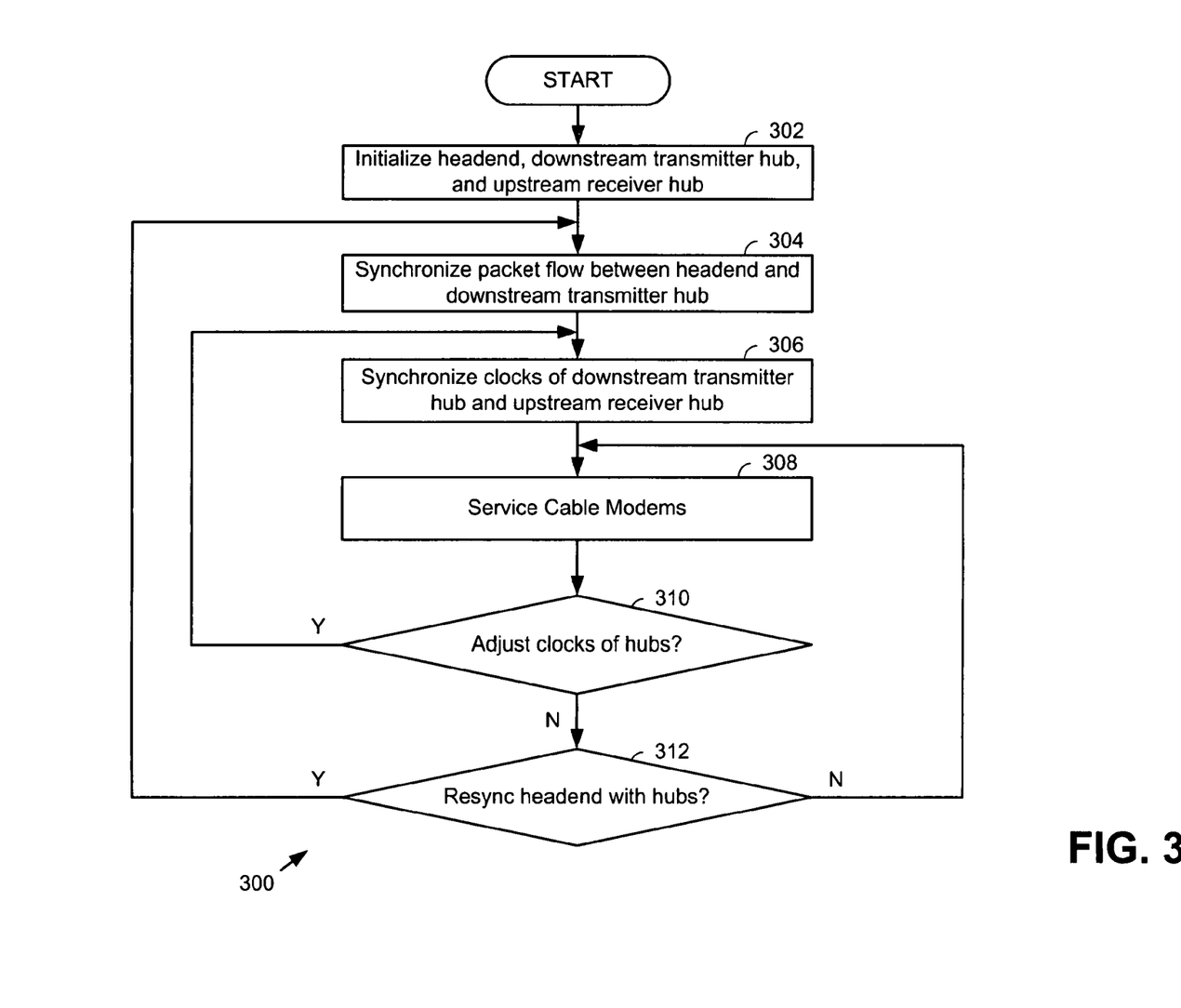
FIG. 3 is a flow chart illustrating operation according to an embodiment of the present invention.

FIG. 3 is a flow chart illustrating operation according to an embodiment of the present invention. Operation commences in initializing the head end 102, the downstream transmitter hub 214, and the upstream receiver hub 216 for operation (step 302). With this step complete, operation continues in establishing packet flow synchronization between the head end 102 and the downstream transmitter hub 214 (step 304). Techniques for performing packet flow synchronization are described further with reference to FIGS. 5 and 6. These operations may further be described herein as regulating packet data flow from the head end 102 to the downstream transmitter hub 214.

Operation continues with synchronizing the clock 206 of the downstream transmitter hub 214 and the clock 208 of upstream receiver hub 216 (step 306). According to the present invention, synchronizing the clock 208 of the upstream receiver hub 216 with the clock 206 of the downstream transmitter hub 206 is performed using ranging operations supported by at least one CM 110 coupled to both the upstream receiver hub 216 and to the downstream transmitter hub 214 via the cable modem network plant 210.

According to one embodiment of step 306, the ranging operations are supported by a plurality of CMs 110 for which the head end 102, the downstream transmitter hub 214, and the upstream receiver hub 216 together provide data service. Normally, ranging is done every 15 seconds or so for each CM 110, so tens to hundreds of time-of-arrival measurements are made each second. With another embodiment, the ranging operations are supported by a dedicated clock synchronization CM. The dedicated clock synchronization CM may be ranged at a high rate, perhaps 10 to 100 times per second. These additional ranging measurements, when smoothed (in a control loop with a slow time constant, say one second or several seconds), give a high confidence in the estimation of the timing drift between the clock 206 of the downstream transmitter hub 214 and the clock 208 of the upstream receiver hub 216. However, since the delay of the cable plant is assumed not to be changing quickly and the frequencies of the clocks should not be changing except due to explicit and intentional changes plus natural clock drift, it should not be necessary to combine very large numbers of measurements to obtain a timing estimate with sufficient accuracy and confidence. Of course, combinations of these embodiments may be employed using both normal ranging information and measurements of one or more dedicated clock synchronization CMs. In either case, the ranging operations are employed to synchronize the clocks 206 and 208 of the downstream transmitter hub 214 and the upstream receiver hub 216, respectively. Also, data bursts may be used in addition to ranging bursts to glean additional information; if data bursts arrive early or late at the receiver hub, that can help define a trend, which implies a frequency offset in the reference clocks, which can then be trimmed out.

Operation of FIG. 3 continues in servicing the CMs, according to one or more aspects of the DOCSIS specification (step 308). The operations of step 308 continue until it is determined that adjustment of the clock 206 of the downstream transmitter hub 214 and/or of the clock 208 of the upstream receiver hub is required (step 310). When adjustment of the clocks 206 and 208 of the downstream transmitter hub 214 and of the upstream receiver hub 216, respectively (as determined at step 310) is/are required, operation returns to step 306. Otherwise, operation proceeds to step 312 where it is determined whether adjustment of the packet flow synchronization of the head end 102 with the downstream transmitter hub 214 is required. If so operation returns from step 312 to step 304. If not, operation proceeds from step 312 to step 308 where service of the CM continues.

As the reader will appreciate, the operations of FIG. 3 may be performed in varying orders that may differ from the order of operations presented in FIG. 3. Synchronization of the clocks 206 and 204 of the downstream transmitter hub 214 and the head end 102, respectively, may occur during the packet flow synchronization of the head end with the downstream transmitter hub 214 and/or during the time period the CMs are serviced. Typically, maintaining synchronization, both packet flow synchronization and clock synchronization, is ongoing and may be performed at any time.

Figure 4:
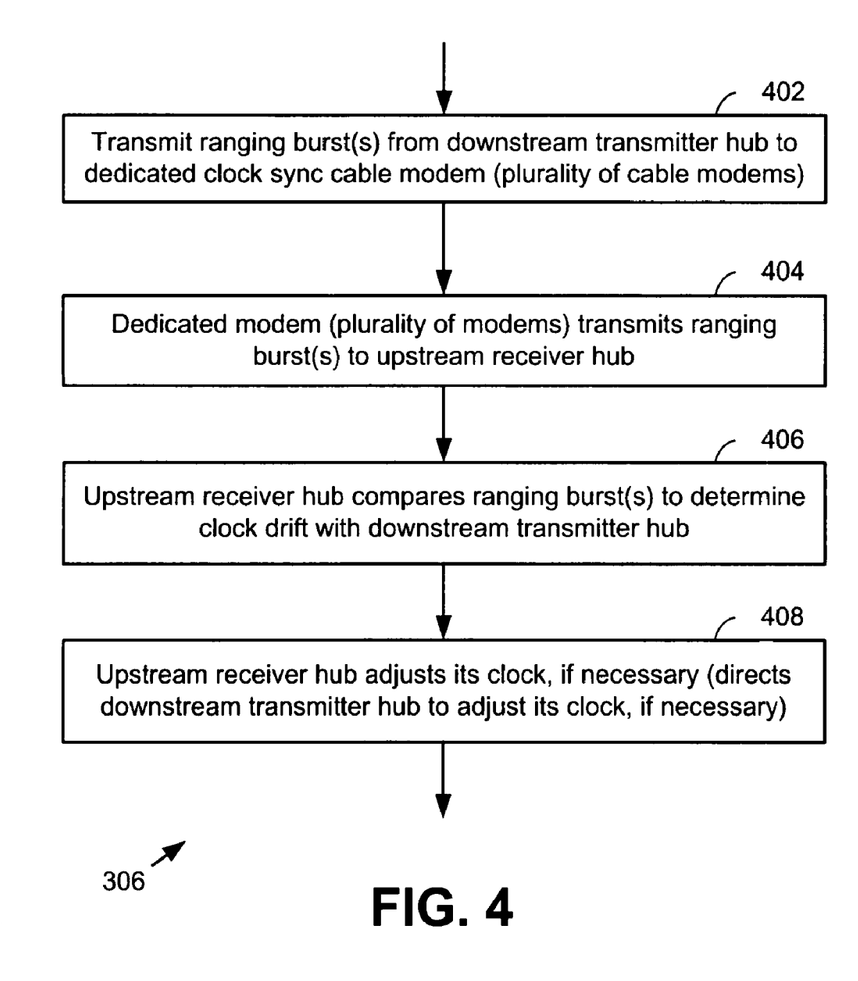
FIG. 4 is a flow chart illustrating a first embodiment of the present invention for synchronizing clocks of a downstream transmitter hub and an upstream receiver hub.

FIG. 4 is a flow chart illustrating a first embodiment of the present invention for synchronizing clocks of a downstream transmitter hub and an upstream receiver hub (step 306 of FIG. 3). Operation commences by transmitting ranging bursts from the downstream transmitter hub 214 to a dedicated clock synchronization CM or to one or a plurality of CMs (step 402). The dedicated clock synchronization CM or the one or a plurality of CMs receive the ranging bursts from the downstream transmitter hub 214, process the ranging bursts, and transmit the ranging bursts to the upstream receiver hub 216 (step 404). The upstream receiver hub 216 receives the ranging bursts and analyzes the ranging bursts to estimate the clock frequency difference between its clock 208 and the clock 206 of the downstream transmitter hub 214 (step 406). The clock drift may manifest itself over time such that adjustments of the upstream receiver hub 216 clock 208 or the downstream transmitter hub 214 clock 206 may be performed at a regular interval, at a non-regular interval, or when the drift exceeds a threshold. Thus, the upstream receiver hub 216 adjusts its clock 208 if necessary or alternatively directs the downstream transmitter hub 214 to adjust its clock 206, if necessary (step 408).

Figure 5:
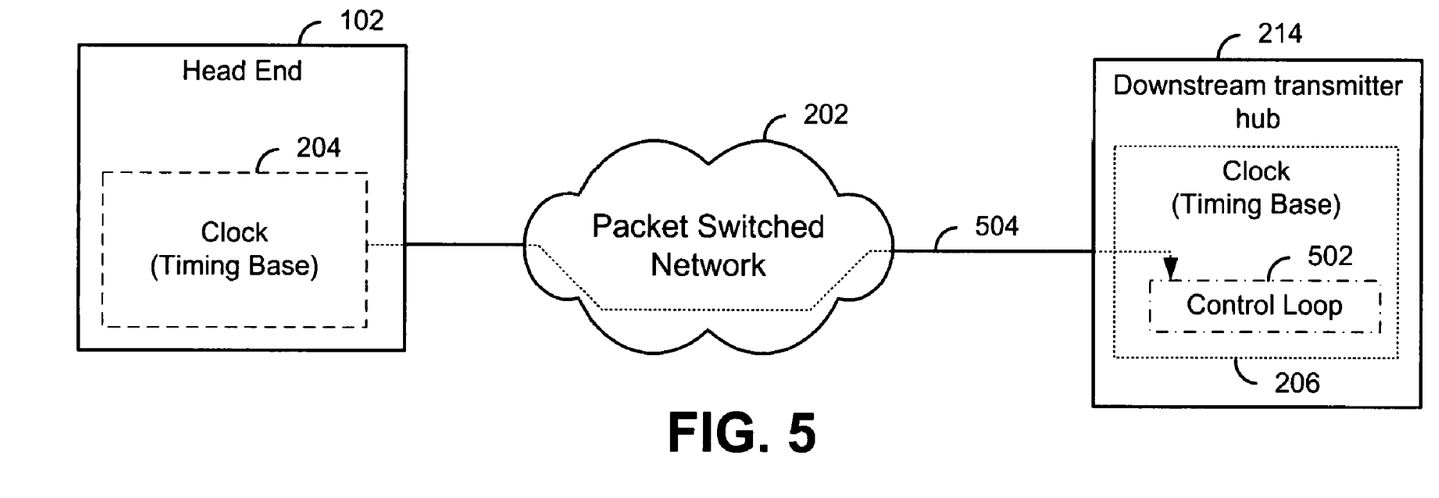
FIG. 5 is a block diagram illustrating an embodiment of the present invention for establishing packet flow synchronization between a head end and a downstream transmitter hub.

FIG. 5 is a block diagram illustrating an embodiment of the present invention for establishing packet flow synchronization between a head end and a downstream transmitter hub. Shown in FIG. 5 are the head end 102, the clock 204 of the head end 102, the downstream transmitter hub 214, the clock 206 of the downstream transmitter hub 214, and the packet data network 202. According to the embodiment of step 304 of FIG. 3 a control loop 502 may be employed to establish packet flow synchronization between the head end 102 and the downstream transmitter hub 214. In such embodiment, the control loop 502 is associated with the downstream transmitter hub 206 and is responsive to timing information (time stamps) of the head end 102 clock 204 received across the packet data network 202. Control loops are generally known and will not be described further herein except as how they relate to the present invention. Because the packet data network 202 is jittery, the control loop 502 may be employed to synchronize the downstream transmitter hub clock 214 with the head end clock 204 over time with adequate precision for some supported operations, e.g., 100 ns required for TDMA operation. The latency introduced by the control loop 502 may be excessive for some applications. Further, the time to lock the control loop 502 may be excessive for some applications. Thus, while the control loop 502 is not sufficient to synchronize the head end clock 204 with the downstream transmitter hub clock 206 in all cases, the control loop 502 is typically sufficient to establish packet flow synchronization between the head end 102 and the downstream transmitter hub 214.

Using the control loop 502, the head end 102 transmits time stamps (TS) with packet data. These time stamps are shown to travel along path 504 from the clock (timing base) 204 to the clock (timing base) 206. The TS indicate instantaneous values of the clock (time base) 204 of the head end 102, the time base being driven by the clock 204. The control loop 502 of the downstream transmitter hub 214 compares the values of TS at the time they are received with the transmitter hub's 214 own clock (timing base) 206. The downstream transmitter hub 214 clock (timing base) 206 may be initialized to the value of the first TS when the first TS is received, and subsequently operated in a closed loop with the clock (timing base) 204 of the head end 102 by comparing subsequent TS with the timing base 206. The result of the comparison between a received TS and the timing base 206 can be filtered and scaled to give desired loop performance characteristics. Typically the filter is a form of low pass filter, either an FIR filter or IIR filter. The filter may resemble an integrator, although the filter response may be somewhat different from a pure integrator (another zero and pole) in order to ensure loop stability. The scaling of the filter result, i.e. multiplication by a constant, can control the loop gain. Such loops can be designed for high gain i.e. quick response or low gain i.e. slow response. The loop can be designed for variable gain i.e. variable response, so as to achieve lock with the head end 102 clock 204 frequency quickly using high gain and also to achieve very low variations in transmitter hub 214 clock frequency once locked has been achieved, or partially achieved. There can be any number of gain settings. Loop design, gain settings, locks detection, etc. are well known in PLL design.

Figure 6:
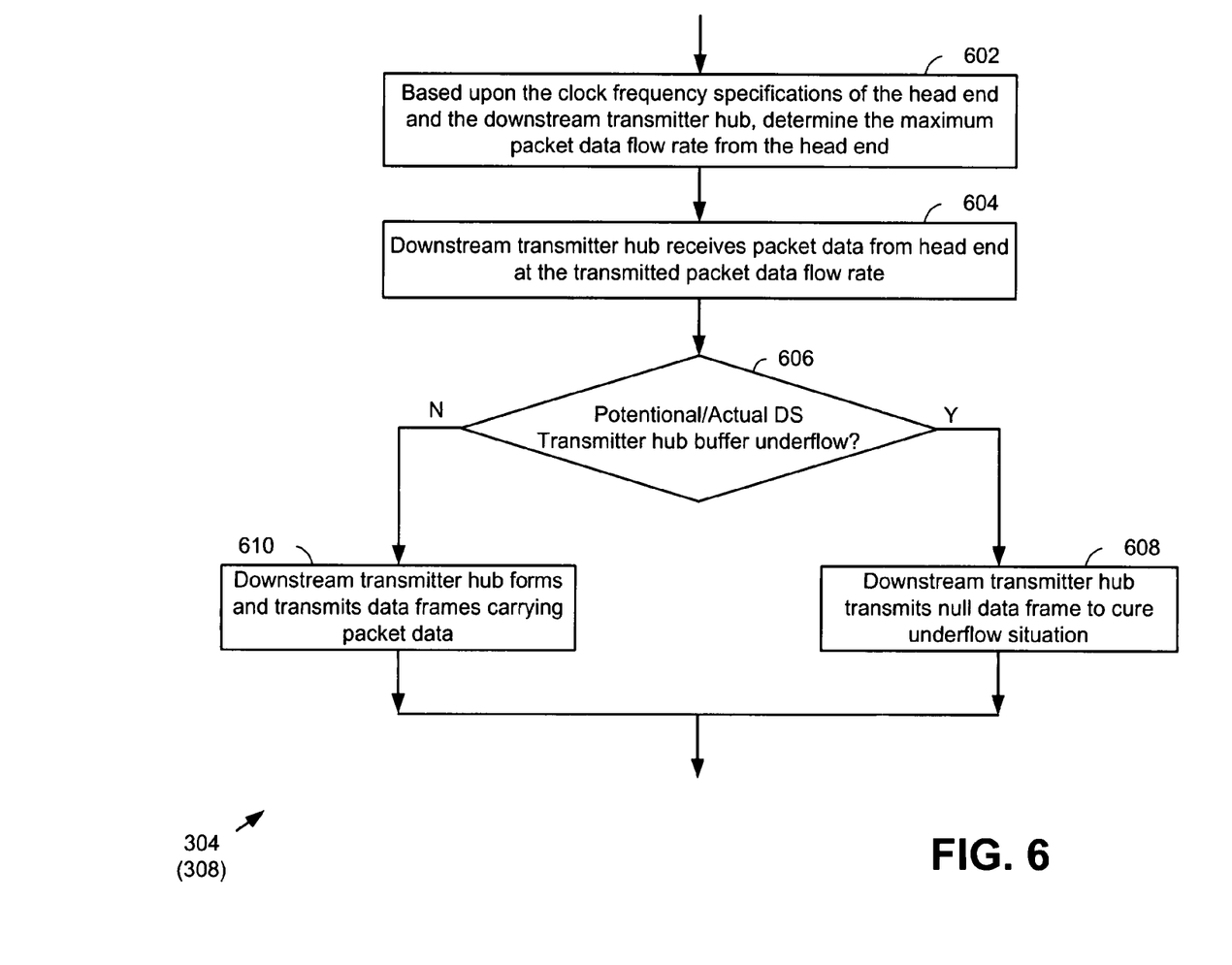
FIG. 6 is a flow chart illustrating another embodiment establishing packet flow synchronization between a head end and an upstream receiver hub according to the present invention.

FIG. 6 is a flow chart illustrating another embodiment for establishing packet flow synchronization between a head end and a downstream transmitter hub according to the present invention. The operations of FIG. 6 correspond to steps 304 and 308 of FIG. 3. Operation commences with, based upon clock frequency specifications of the head end 102 and of the downstream transmitter hub 214, determining a maximum packet data flow rate that should prevent overflow of a transmit buffer of the downstream transmitter hub 214 (step 602). The operations of step 602 would typically be performed in a design process and be later implemented. Operation continues with the head end 102 transmitting packet data from the head end at a rate that that does not exceed the packet data flow rate (step 604). The downstream transmitter hub 214 receives the packet data, forms the packet data into data frames, and transmits the data frames to the CMs 110 according to the DOCSIS specification, for example. At some time, if the downstream transmitter hub 214 may be transmitting packet data at a greater rate than it is receiving packet data from the head end 102, downstream transmitter hub 214 transmit buffer underflow may occur. Thus, at step 606 the downstream transmitter hub 214 determines whether a downstream transmitter hub 214 transmit buffer underflow has occurred or is about to occur, i.e. if the transmit buffer becomes empty or nearly empty. If a downstream transmitter hub buffer becomes empty, or if it is about to go empty, the downstream transmitter hub transmits one or more null data frames to cure the underflow situation (step 608), i.e. until there is sufficient data in the transmit buffer to enable resumption of transmission of data. However, during normal operations with the head end 102 substantially synchronized with the downstream transmitter hub 214 on a packet flow basis and while the head end transmits data at the maximum rate determined in step 602, the downstream transmitter hub 214 forms and transmits data frames carrying packet data to serviced CMs without insertion of null frames (step 610). During normal operations with the head end 102 substantially synchronized with the downstream transmitter hub 214 on a packet flow basis and with the head end transmitting data at less than the maximum rate determined in step 602, the downstream transmitter hub 214 forms and transmits data frames carrying packet data to serviced CMs with the insertion of null frames (step 610) as appropriate to prevent or cure underflow conditions.

The relationship of the data rate demand from the head end 102 to the downstream transmitter hub 214 data rate, and the prevalence of null packets are design variables with multiple solutions. In scenarios where the network delay (between the head end 102 and the downstream transmitter hub 214) is bounded to a known upper limit, the head end 102 data rate can be almost equal to the downstream transmitter hub 214 rate, with the required difference being determined by the maximum difference between the clock rates of the head end 102 and the downstream transmitter hub 214. If for example each clock has a worst case tolerance of 5 ppm, then the total worst case difference is 10 ppm, and in this case the head end 102 should limit its bandwidth demand to 1-10 ppm=0.9999 of the nominal transmitter hub 214 data rate, to cover the case where the head end 102 is at the max frequency and the downstream transmitter hub 214 is at the minimum frequency. Assuming a data rate of 38 Mbps and that a null data frame consists of 188 byte (1504 bit) data packets, for example, the downstream transmitter hub 214 would insert null data frames at a rate of 10 ppm*38 Mbps/1504 bits/packet~=0.25 data frames/second or about one null data frame per 4 seconds. Of course, this rate depends on the actual relative frequencies of the head end and hub and is not independent of that relationship. In a case where the head end 102 is operating at a minimum specified frequency and the transmitter hub 214 is operating at a maximum specified frequency, the rate of inserted null data frames is doubled to approximately 0.5 packets/second.

There are various ways for the downstream transmitter hub 214 to determine when to insert null data frames. In one approach, the downstream transmitter hub 214 receives data packets from the head end 102, frames it, and transmits it as soon as possible. Whenever the transmitter hub 214 does not have enough data in its input buffer to be able to form a complete data frame, it sends a null data frame. In such a design, the delay of data traversing the receive buffer trends towards zero. The delay can increase when the network delay changes from a relatively long delay to a relatively short delay. As long as the downstream transmitter hub 214 data rate is greater than the head end 102 data rate, the transmitter hub 214 will normally remove data from the buffer faster than data enters the buffer, and so the buffer fullness tends towards zero over the long term.

If there are multiple classes of data such that some data requires a shorter delay or more predictable delay, data can be transmitted from the head end 102 to the downstream transmitter hub 214 with such classifications indicated. The downstream transmitter hub 214 can prioritize the transmission of data according to the classification of data type, e.g. transmitting higher priority data in its buffer before transmitting lower priority data. This minimizes the additional delay imposed by the buffer on the more delay-sensitive data.

Figure 7:
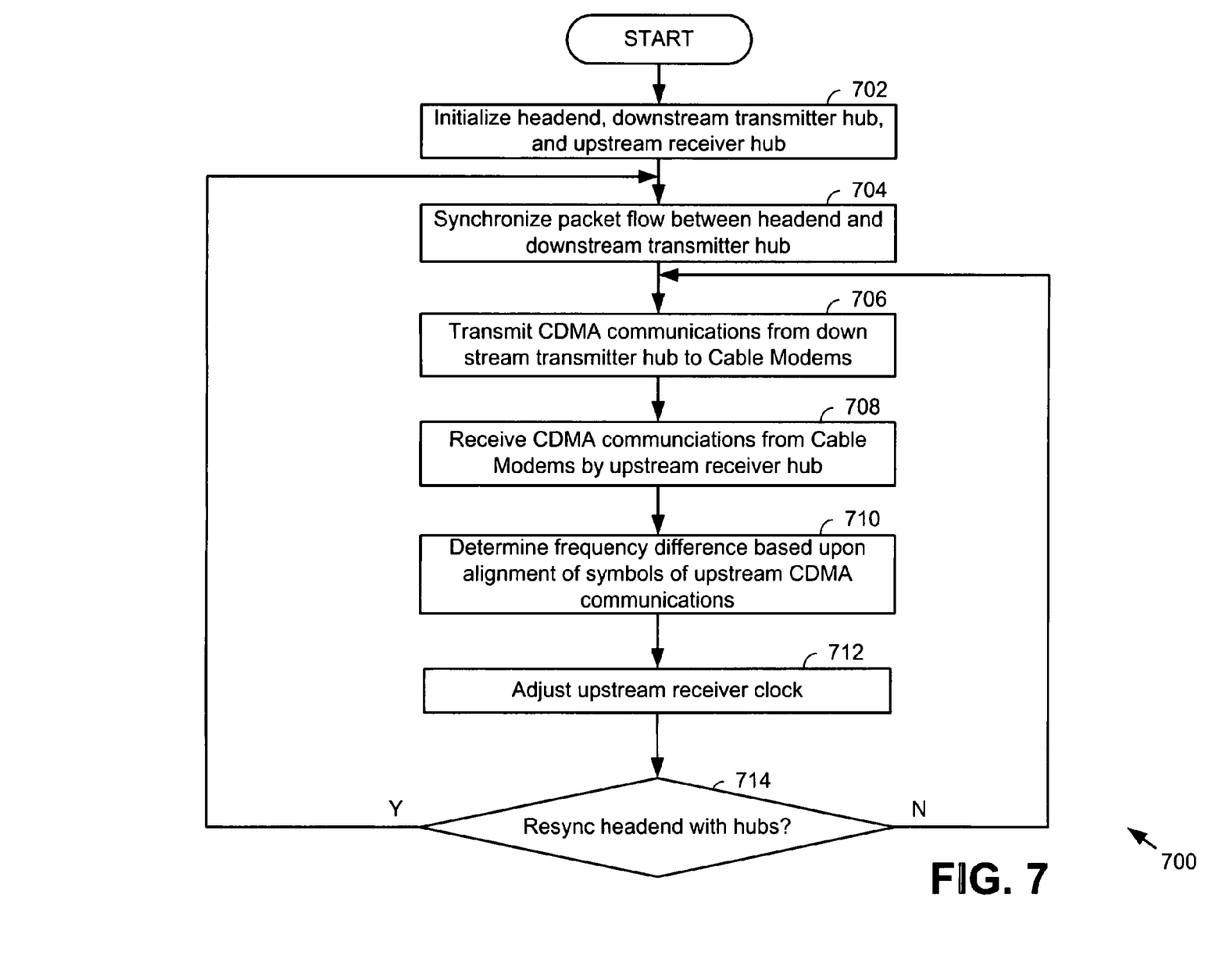
FIG. 7 is a flow chart illustrating operation according to another embodiment of the present invention for synchronizing CMTS components.

FIG. 7 is a flow chart illustrating operation according to another embodiment of the present invention for synchronizing CMTS components. Operation commences in initializing the head end 102, the downstream transmitter hub 214, and the upstream receiver hub 216 for operation (step 702). With this step complete, operation continues in establishing packet flow synchronization between the head end 102 and the downstream transmitter hub 214 (step 704). Techniques for performing packet flow synchronization were described with reference to FIGS. 5 and 6. These operations may further be described herein as regulating packet data flow from the head end 102 to the downstream transmitter hub 214.

Operation continues with the downstream transmitter hub 214 transmitting downstream Code Division Multiple Access (CDMA) communications to a plurality of serviced cable modems 110 (step 706), e.g., downstream transmissions. Then, operation proceeds with the upstream receiver hub receiving upstream CDMA communications from the plurality of serviced cable modems (step 708). The upstream receiver hub then determines a drift in alignment, if any, of symbols of the upstream communications received from the plurality of serviced cable modems with respect to a timing base of the upstream receiver hub (step 710). The measured drift in alignment is then used to adjust the frequency of the upstream receiver clock (Step 712). Operation proceeds to step 714 where it is determined whether adjustment of the packet flow synchronization of the head end 102 with the downstream transmitter hub 214 is required. If so operation returns from step 714 to step 704. If not, operation proceeds from step 714 to step 706 where service of the CM continues. As the reader will appreciate, the operations of FIG. 7 may be performed in varying orders that may differ from the order of operations presented in FIG. 7. Typically, maintaining synchronization, both packet flow synchronization and clock synchronization, is ongoing and may be performed at any time.

In view of the above detailed description of the invention and associated drawings, other modifications and variations will now become apparent. It should also be apparent that such other modifications and variations may be effected without departing from the spirit and scope of the invention.

The invention claimed is:

1. A method for synchronizing operation of distributed cable modem termination system components, the method comprising:
   establishing packet flow synchronization between a head end and a downstream transmitter hub, wherein the downstream transmitter hub communicatively couples to the head end via a packet data network; and
   synchronizing a clock of an upstream receiver hub with a clock of the downstream transmitter hub using ranging operations supported by at least one cable modem communicatively coupled to both the upstream receiver hub and the downstream transmitter hub via cable modem network plant, the ranging operations including transmitting ranging bursts from the downstream transmitter hub to the at least one cable modem, processing the received ranging bursts within the at least one cable modem, and transmitting received and processed ranging bursts from the at least one cable modem to the upstream receiver hub.

2. The method of claim 1, wherein the ranging operations are supported by a plurality of cable modems for which the headend, the downstream transmitter hub, and the upstream receiver hub together provide data service.

3. The method of claim 1, wherein the ranging operations are supported by a dedicated clock synchronization cable modem.

4. The method of claim 1, wherein establishing packet flow synchronization between the head end and the downstream transmitter hub comprises enabling a control loop associated with the downstream transmitter hub that is responsive to timing information of the head end received across the packet data network.

5. The method of claim 1, wherein establishing packet flow synchronization between a head end and a downstream transmitter hub comprises:
   transmitting data packets from the head end to the downstream transmitter hub at a rate that prevents overflow of a buffer of the downstream transmitter hub; and
   forming null data frames by the downstream transmitter hub to prevent an underflow of the buffer of the downstream transmitter hub.

6. The method of claim 5, wherein the rate that prevents overflow of the buffer of the downstream transmitter hub is based upon both a clock specification of the clock of the head end and a clock specification of the clock of the downstream transmitter hub.

7. The method of claim 1, wherein synchronizing the clock of the upstream receiver hub with the clock of the downstream transmitter hub comprises the upstream receiver hub adjusting its clock to correspond to the clock of the downstream transmitter hub.

8. The method of claim 1, wherein synchronizing the clock of the upstream receiver hub with the clock of the downstream transmitter hub comprises the downstream transmitter hub adjusting its clock to correspond to the clock of the upstream receiver hub upon receipt of adjustment information from the upstream receiver hub.

9. A method for synchronizing operation of distributed cable modem termination system components, the method comprising:
   regulating packet data flow from a head end to a downstream transmitter hub to avoid overflow and underflow of a buffer of the downstream transmitter hub, wherein the downstream transmitter hub communicatively couples to the head end via a packet data network; and
   synchronizing a clock of an upstream receiver hub with a clock of the downstream transmitter hub using ranging operations supported by at least one cable modem communicatively coupled to both the upstream receiver hub and the downstream transmitter hub via cable modem network plant, the ranging operations including transmitting ranging bursts from the downstream transmitter hub to the at least one cable modem, processing the received ranging bursts within the at least one cable modem, and transmitting received and processed ranging bursts from the at least one cable modem to the upstream receiver hub.

10. The method of claim 9, wherein the ranging operations are supported by a plurality of cable modems for which the headend, the downstream transmitter hub, and the upstream receiver hub together provide data service.

11. The method of claim 9, wherein the ranging operations are supported by a dedicated clock synchronization cable modem.

12. The method of claim 9, wherein regulating packet data flow from a head end to a downstream transmitter hub to avoid overflow and underflow of a buffer of the downstream transmitter hub includes enabling a control loop associated with the downstream transmitter hub that is responsive to timing information of the head end received across the packet data network.

13. The method of claim 9, further comprising preventing underflow of the buffer of the downstream transmitter hub by the downstream transmitter forming and transmitting null data frames.

14. The method of claim 9, wherein synchronizing the clock of the upstream receiver hub with the clock of the downstream transmitter hub comprises the upstream receiver hub adjusting its clock to correspond to the clock of the downstream transmitter hub.

15. The method of claim 9, wherein synchronizing the clock of the upstream receiver hub with the clock of the downstream transmitter hub comprises the downstream transmitter hub adjusting its clock to correspond to the clock of the upstream receiver hub upon receipt of adjustment information from the upstream receiver hub.

16. A distributed cable modem termination system comprising:
   a downstream transmitter hub;
   an upstream receiver hub; and
   a head end communicatively coupled to the downstream transmitter hub and to the upstream receiver hub by a packet data network; and wherein:
   the head end and the downstream transmitter hub establish packet flow synchronization there between;
   the upstream receiver hub and the downstream transmitter hub synchronize a clock of the upstream receiver hub with a clock of the downstream transmitter hub using ranging operations supported by at least one cable modem communicatively coupled to both the upstream receiver hub and the downstream transmitter hub via cable modem network plant; and
   the ranging operations including the downstream transmitter hub transmitting ranging bursts to the at least one cable modem, the cable modem processing the received ranging bursts, and the cable modem transmitting the received and processed ranging bursts to the upstream receiver hub.

17. The system of claim 16, further comprising a plurality of cable modems that support the ranging operations and which receive data service from the headend, the downstream transmitter hub, and the upstream receiver hub.

18. The system of claim 16, further comprising a dedicated clock synchronization cable modem that supports the ranging operations.

19. The system of claim 16, further comprising a control loop associated with the downstream transmitter hub that is responsive to timing information of the head end received across the packet data network to establish the packet flow synchronization there between.

20. The system of claim 16, wherein in establishing packet flow synchronization between the head end and the downstream transmitter hub:
the head end transmits data packets to the downstream transmitter hub at a rate that prevents overflow of a buffer of the downstream transmitter hub; and
the downstream transmitter hub forms null data frames to prevent underflow of the buffer of the downstream transmitter hub.

21. The system of claim 20, wherein the rate to prevent overflow of the buffer of the downstream transmitter hub is based upon both a clock specification of a clock of the head end and a clock specification of the clock of the downstream transmitter hub.

22. The system of claim 16, wherein the upstream receiver hub synchronizes its clock with the clock of the downstream transmitter hub by adjusting its clock to correspond to the clock of the downstream transmitter hub.

23. The system of claim 16, wherein the downstream transmitter hub synchronizes its clock with the clock of the upstream receiver hub by adjusting its clock to correspond to the clock of the upstream receiver hub upon receipt of adjustment information from the upstream receiver hub.

24. A distributed cable modem termination system comprising:
a downstream transmitter hub;
an upstream receiver hub; and
a head end communicatively coupled to the downstream transmitter hub and to the upstream receiver hub by a packet data network; and wherein:
the head end regulates downstream data flow from itself to the downstream transmitter hub to avoid overflow of a buffer of the downstream transmitter hub;
the upstream receiver hub and the downstream transmitter hub synchronize a clock of an upstream receiver hub with a clock of the downstream transmitter hub using ranging operations supported by at least one cable modem communicatively coupled to both the upstream receiver hub and the downstream transmitter hub via cable modem network plant; and
the ranging operations including the downstream transmitter hub transmitting ranging bursts to the at least one cable modem, the cable modem processing the received ranging bursts, and the cable modem transmitting the received and processed ranging bursts to the upstream receiver hub.

25. The system of claim 24, further comprising a plurality of cable modems that that support the ranging operations and which receive data service from the headend, the downstream transmitter hub, and the upstream receiver hub.

26. The system of claim 24, further comprising a dedicated clock synchronization cable modem that supports the ranging operations.

27. The system of claim 24, further comprising a control loop associated with the downstream transmitter hub responsive to timing information of the head end received across the packet data network and that regulates downstream data flow from the headend to the downstream transmitter hub.

28. The system of claim 24, wherein the head end transmits data to the downstream transmitter hub at a rate that is based upon both a clock specification of the clock of the head end and a clock specification of the clock of the downstream transmitter hub.

29. The system of claim 24, wherein the upstream receiver hub is synchronizes its clock with the clock of the downstream transmitter hub by adjusting its clock to correspond to the clock of the downstream transmitter hub.

30. The system of claim 24, wherein the downstream transmitter hub synchronizes its clock with the clock of the upstream receiver hub by adjusting its clock to correspond to the clock of the upstream receiver hub upon receipt of adjustment information from the upstream receiver hub.

* * * * *